United States Patent

[11] 3,627,724

| [72] | Inventor | Donald H. Lambert |
| | | Marlboro, Mass. |
| [21] | Appl. No. | 881,889 |
| [22] | Filed | Dec. 3, 1969 |
| [45] | Patented | Dec. 14, 1971 |
| [73] | Assignee | Cabot Corporation |
| | | Boston, Mass. |

[54] RUBBER COMPOSITIONS
6 Claims, No Drawings

[52] U.S. Cl. .................................................... 260/41.5 A,
106/288 B, 106/308 N, 260/448.2 N
[51] Int. Cl. ........................................................... C08d 9/00
[50] Field of Search ............................................. 106/288 B,
308 N; 260/448.2 N, 41.5 A; 117/123 C, 124 D,
126 GN, 126 GQ

[56] References Cited
FOREIGN PATENTS 1,024,234   3/1966   Great Britain................   260/375 B

OTHER REFERENCES

Kraus− Reinforcement of Elastomers (Interscience) (N.Y.) (1965). pages 410, 411 & 429, TS 1925 K7

Whitby− Synthetic Rubber (Wiley)(N.Y.)(1954), page 380, TS 1925 W45

*Primary Examiner*—Morris Liebman
*Assistant Examiner*—H. H. Fletcher
*Attorneys*—Kenneth W. Brown, Arthur S. Collins, Barry R. Blaker and Lawrence Chaletsky ABSTRACT: This disclosure relates to the use of certain disilazane treated colloidal silicas as processing aids for rubbery copolymers of styrene and butadiene.

RUBBER COMPOSITIONS

This invention relates to new and useful synthetic rubber compositions. In particular, this invention relates to new and improved synthetic rubber compositions comprising a copolymer of styrene with butadiene and certain disilazane treated colloidal silicas which improve the physical properties of the copolymer to which it is added.

Normally, silica materials, including silica which is in a finely divided form, have been widely employed as fillers and reinforcing pigments in the compounding of rubber. Ordinarily, the silica materials are effective in the preparation of rubber vulcanizates having improved properties of reinforcement, tensile strength, and/or elongation. Unfortunately, however, a major disadvantage accompanying the use of silica materials in preparing the rubber compounds for vulcanization is the very high viscosity of the resultant silica/rubber mixtures which renders them difficult to process. Heretofore, a proposed method for reducing the viscosity of the rubber/silica compound without unduly affecting the mechanical properties of the final vulcanizate has entailed the use therein of a sterically hindered glycol such as 2, 2, 4-trimethyl-3, 3-pentanediol as a plasticizer.

Accordingly, it is a principal object of this invention to provide improved synthetic rubber compositions wherein the attendant disadvantages of the prior art are eliminated.

It is a further object of this invention to provide an additive for rubbery copolymers of styrene and butadiene which provides the desired processing properties and does not impair the mechanical properties of the resultant composition.

Other objects and advantages of the present invention will be apparent to those skilled in the art from the following detailed description and claims.

In accordance with this invention, it has been found that the above and still further objects are accomplished by incorporating a rubbery copolymer of styrene with butadiene and certain disilazane-treated colloidal silicas.

In general, amounts ranging up to 200 parts by weight of processing aid can be used for each 100 parts by weight of styrene-butadiene copolymer. However, it is preferred to use amounts of from about 15 to about 90 parts by weight of processing aid per 100 parts by weight of styrene-butadiene copolymer.

The rubbery styrene-butadiene copolymers for which the disilazane treated colloidal silicas of this invention are effective as processing aids include copolymers of from about 10 to about 70 percent by weight of styrene and from about 90 to about 30 percent by weight of butadiene. Thus, there may be employed as rubbery copolymers suitable for use with this invention a copolymer of 10 parts styrene and 90 parts butadiene, a copolymer of 19 parts styrene and 81 parts butadiene, a copolymer of 23.5 parts styrene and 76.5 parts butadiene, a copolymer of 30 parts styrene and 70 parts butadiene, a copolymer of 43 parts styrene and 57 parts butadiene and a copolymer of 50 parts styrene and 50 parts butadiene. Preferably, a copolymer of 23.5 parts styrene and 76.5 parts butadiene is utilized herein.

The processing aids utilized in the rubber compositions of the present invention include colloidal silicas having chemically bonded to the surface thereof amounts of from about 0.01 to about 30 percent by weight based on the weight of the silica of a disilazane treating material. In a preferred embodiment of the present invention, however, products comprising colloidal silicas having chemically bonded to the surface thereof amounts ranging from about 1 to about 10 percent by weight based on the weight of the silica of the disilazane treating material are employed as the processing aids for the rubbery styrene-butadiene copolymers. The disilazanes useful as treating materials with this invention have the general formula

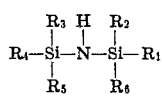

wherein $R_1$, $R_2$, $R_3$, $R_4$, $R_5$, and $R_6$ are like or unlike radicals selected from the group consisting of alkyl having one to five carbon atoms.

Representative examples of the disilazane compounds which may be employed herein are hexamethyldisilazane, hexaethyldisilazane, hexapropyldisilazane, hexabutyldisilazane, trimethyltributyldisilazane, tripropyltributyldisilazane, dimethyltetrapropyldisilazane, tetrabutyldiethyldisilazane and the like.

The colloidal silicas which can be used in the process of this invention are well known in the art and includes silicas prepared by pyrogenic and precipitation processes. However, while such silicas are generally operable in the process of the invention, the present process is particularly suitable for colloidal silicas having an average ultimate particle diameter of less than about 0.5 micron and preferably less than about 0.1 micron. It is furthermore desirable that the silica be relatively nonporous, i.e., that the greater portion of the total surface area thereof be external rather than internal. The pyrogenic process wherein a silicon compound, such as silicon tetrachloride, silicon disulfide and the like, in vapor form is oxidized and/or hydrolyzed at elevated temperatures with the aid of a free oxygen-containing gas. If desired, in a typical process for carrying out this reaction which is not self-sustaining, auxiliary heat may be provided to the reaction zone by preheating the reactants and/or reaction zone. Further details relating to the production of pyrogenic silicas may be found in numerous patents including, for example, U.S. Pat. Nos. 2,428,178; 2,990,249; 3,024,089; 3,043,062; 3,086,841; 3,130,008; 3,203,759 and 3,416,980. The precipitated silicas are prepared by the well-known technique of acidulating or neutralizing an aqueous alkali metal silicate solution. The acidulation or neutralization results in precipitation of a silica hydrosol from solution which is then aged to a gel or semigel state, washed to remove alkali metal salts, dried and ground to a fine powder. Additional details concerning the production of silicas by precipitation processes are readily available in many references such as U.S. Pat. Nos. 2,865,777; 2,900,348; 2,913,419; 2,995,422; 3,010,791; 3,034,913; 3,172,726 and 3,250,594.

The disilazane treated colloidal silica products of the present invention are readily prepared by methods well known in the art. For example, the disilazane treated silicas may be obtained by brushing, dipping, or spraying the disilazane treating material, contacting the silica with vapors of the disilazane, or treating the silica with a solution of the disilazane material dissolved in a solvent. Another method for preparing the disilazane treated silicas involves reacting the disilazane with silica in a fluid bed at elevated temperatures. It is preferred, however, to prepare the disilazane treated silicas by a continuous process which entails continuously adding silica through a restricted passage into a flowing stream of atomized disilazane treating material. The continuous process is carried out at temperatures ranging from about 0° to about 450° C. and the resultant treated oxide is recovered downstream of the point where the silica is introduced. Additionally, if desired, a catalyst such as glacial acetic acid may be added to the reaction mixture to promote hydrolysis of the disilazane material.

The rubber compositions of this invention are readily prepared by mechanical methods. For example, the rubbery styrene-butadiene copolymer and the disilazane treated silica are intimately admixed together on a conventional mixing machine of the type normally used for mixing rubber or plastics such as a mill roll or a Banbury mixer in order to insure efficient dispersion. In evaluating the physical properties and efficiency of the processing aids of the present invention in the resultant rubbery compositions, the measurements are determined on a Monsanto Rheometer operated for a period of 120 minutes at a low speed setting, an arc setting of 3°, and a curing temperature of 293° F. In the following table of data, the parameter L(min.) is a measure of minimum torque developed and Δ L(m) is a measure of reinforcement as determined by calculating the difference between maximum torque and minimum torque on the Monsanto Rheometer.

The invention will be more readily understood by reference to the following examples which describe the advantageous and unexpected results achieved by the use of the processing aids of the present invention with rubbery styrene-butadiene copolymers. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

In the following examples there is described a suitable process for the preparation of the disilazane treated colloidal silicas useful as processing aids with the present invention.

Example 1

To a suitable reaction apparatus equipped with means for addition and removal of heat, temperature recording means, means for introducing disilazane treating material as a finely atomized liqiud, means for metered introduction of a stream of colloidal silica to be treated through a passage or inlet in which there is a constricted or tapered portion of fixed cross section or throat, and means for removal and collection of treated silica product, there is charged at room temperature hexamethyldisilazane as an atomized liquid at a flow rate of 13.3 grams per minute. There is then introduced into the reaction apparatus, downstream of the point where the hexamethyldisilazane is added, Cab—O—Sil M—5 at a rate of 137 grams per minute. The Cab—O—Sil M—5 is introduced by a venturi-type action through a passage in which there is a constricted or tapered portion. Cab—O—Sil M—5 is a pyrogenically prepared silica produced and sold by Cabot Corporation and further characterized in having a BET (Brunauer-Emmett-Teller Method as described in the Journal of the American Chemical Society, 1938, vol. 60, page 309) surface area of about 200 square meters per gram, a particle size of about 0.012 micron, a density of about 2.3 pounds per cubic foot, an ignition loss at 1,000° C. of about 1 percent and a pH value of from 3.5 to 4.2. The reaction product is obtained continuously by means of a cyclone-type dust collector which is situated downstream of the point of reaction. The reaction product is a uniformly treated silica particle having chemically bonded thereto 4.42 percent by weight of the hexamethyldisilazane treating material based on the weight of the silica.

Example 2

According to the procedure of example 1, there is introduced into the reaction chamber hexamethyldisilazane at a rate of 42 grams per minute and Hi—Sil 233 at a rate of 539 grams per minute. Hi—Sil 233 is a finely divided precipitated hydrated silica which is produced and sold by Pittsburgh Plate Glass Company and has an average particle size of about 0.02 micron, a BET surface area of 150 square meters per gram, a specific gravity of 1.95 and a pH value of 7.3. The resulting product comprises a silica particle having chemically bonded thereto 3.8 percent by weight of the hexamethyldisilazane treating material based on the weight of the silica.

Example 3

Following the procedure of example 1, a suitable reaction apparatus is charged with hexamethyldisilazane at a rate of 33.5 grams per minute and Cab—O—Sil HS—5 at a rate of 312 grams per minute. Cab—O—Sil HS—5 is a pyrogenically prepared silica sold by Cabot Corporation and is further characterized in having a surface area of about 325 meters per gram, a particle size of about 0.007 micron, a density of about 2.3 pounds per cubic foot, an ignition loss at 1,000° C. of 2 percent, and a pH value of from 3.6 to 4.1. The resultant reaction product comprises a silica particle having chemically bonded thereto 7 percent by weight of the hexamethyldisilazane treating material based on the weight of the silica.

The following examples illustrate the advantageous and unexpected results which are achieved by the use of the processing aids of the present invention in rubbery styrene-butadiene copolymer compositions but it is not intended that this invention be limited by or to such examples.

Example 4

One hundred parts by weight of a copolymer of 23.5 parts styrene and 73.5 parts butadiene, 5 parts by weight of Circosol 4240, which is a naphthenic processing oil sold by Sun Oil Company, 1 part by weight of stearic acid, 0.75 parts by weight of mercaptobenzothiazyl disulfide (MBTS), 0.5 parts by weight of diorthotolylguanidine (DOTG), 3 parts by weight of sulfur and 50 parts by weight of the disilazane treated silica prepared in example 1 are mixed on a mill roll to a homogeneous blend. Testing of the blend in a Monsanto Rheometer, under the conditions described herein, gives a value of 7.0 inch-pound for the minimum torque developed (L min.), a value of 72.8 inch-pound for the reinforcement level which represents the difference between the maximum and the minimum torques developed ($\Delta$ Lm), and a value of 78 minutes for the time necessary to obtain optimum cure of the rubbery blend.

Example 5

Following the procedure of example 4, the disilazane-treated silica is replaced with 50 parts by weight of untreated Cab—O—Sil M—5. A determination of test measurements on the Monsanto Rheometer reveals a value of 54.0 inch-pound for minimum torque developed (L min.), a value of 61.4 inch-pound for the reinforcement level ($\Delta$ Lm), and a value of 105 minutes for optimum curing time of the rubbery composition.

Example 6

In accordance with the procedure of example 4, a homogeneous blend comprising the ingredients of example 1 and, additionally, 3 parts by weight of zinc oxide is prepared. Evaluation of results obtained on this sample using the Monsanto Rheometer reveal a value of 6.4 inch-pounds for the minimum torque developed (L min.), a value of 83.8 inch-pounds for reinforcement level ($\Delta$ Lm), and a value of 30 minutes for time to optimum cure.

Example 7

A formulation of ingredients as in example 6, including the zinc oxide, but substituting 50 parts by weight of Cab-O-Sil M–5 for the disilazane treated silica employed therein, is milled on a roll mill to a homogeneous blend. The results obtained on this blend when subjected to testing in the Monsanto Rheometer show a value of 47.6 inch-pounds for the minimum torque developed (L min.), a value of 6.8 inch-pounds for the reinforcement level ($\Delta$ Lm), and a value of 115 minutes for optimum curing time.

From the foregoing results it is evident that the properties of the rubbery styrene-butadiene copolymeric compositions of this invention prepared with the disilazane treated silicas are notably superior to those of similar copolymeric compositions prepared with untreated silicas, whether or not zinc oxide activator is present in the formulations. For example, it is readily apparent, following a review of the above data, that the rubbery compositions containing disilazane treated silicas are characterized by having reduced viscosity or improved processibility, reduced time for attaining optimum cure and, according to test procedures utilizing a Monsanto Rheometer, an improved level of reinforcement. In addition, it is found that while these properties of reduced compound viscosity and the like are achieved, other desired physical and mechanical characteristics of the compositions of the present invention are not unduly affected by the incorporation of the processing aids in the compositions of this invention.

Example 8

Following the procedure of example 4, the disilazane treated Cab—O—Sil M-5 is replaced with 50 parts by weight of, firstly, the silica prepared in example 2 and then with the silica prepared in example 3. In each instance, the resultant rubbery styrene-butadiene copolymeric compositions exhibit viscosities which are lower than those of compositions containing identical silicas, respectively, which are untreated.

Example 9

The procedure of example 4 is followed with the exception that the disilazane treated Cab—O—Sil M-5 is compared at levels of 20, 30, 40, 60 and 75 parts of silica per hundred parts by weight of rubbery styrene-butadiene copolymer. The resultant rubber compositions exhibit physical properties similar to those demonstrated in example 1.

For many purposes, it may be desirable to blend other conventional additives with the rubbery compositions of the present invention. Illustrative of such additives are fillers, softeners, curing agents, accelerators and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter comprising a rubbery copolymer of from about 10 to about 70 percent by weight of styrene and from about 90 to about 30 percent by weight of butadiene and as a processing aid a colloidal silica having chemically bonded to the surface thereof amounts of from about 0.01 to about 30 percent by weight based on the weight of the silica of a disilazane compound having the general formula

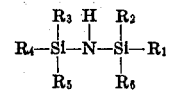

wherein $R_1$, $R_2$, $R_3$, $R_4$, $R_5$ and $R_6$ are like or unlike radicals selected from the group consisting of alkyl having one to five carbon atoms, wherein the processing aid is present in amounts ranging from about 15 to 200 parts by weight per 100 parts by weight of styrene-butadiene copolymer.

2. A composition as defined in claim 1 wherein the processing aid is a colloidal silica having chemically bonded to the surface thereof amounts of from about 1 to about 10 percent by weight based on the weight of the silica of the disilazane compound.

3. A composition as defined in claim 1 wherein the processing aid is present in amounts ranging from about 15 to about 90 parts by weight per 100 parts by weight of the styrene-butadiene copolymer.

4. A composition as defined in claim 1 wherein the disilazane compound is hexamethyldisilazane.

5. A composition as defined in claim 1 wherein the silica has an average ultimate particle diameter of less than about 0.5 micron.

6. A composition as defined in claim 1 wherein the silica has an average ultimate particle diameter of less than about 0.1 micron.

* * * * *